(No Model.)
C. BOUL.
Plow.
No. 232,877. Patented Oct. 5, 1880.
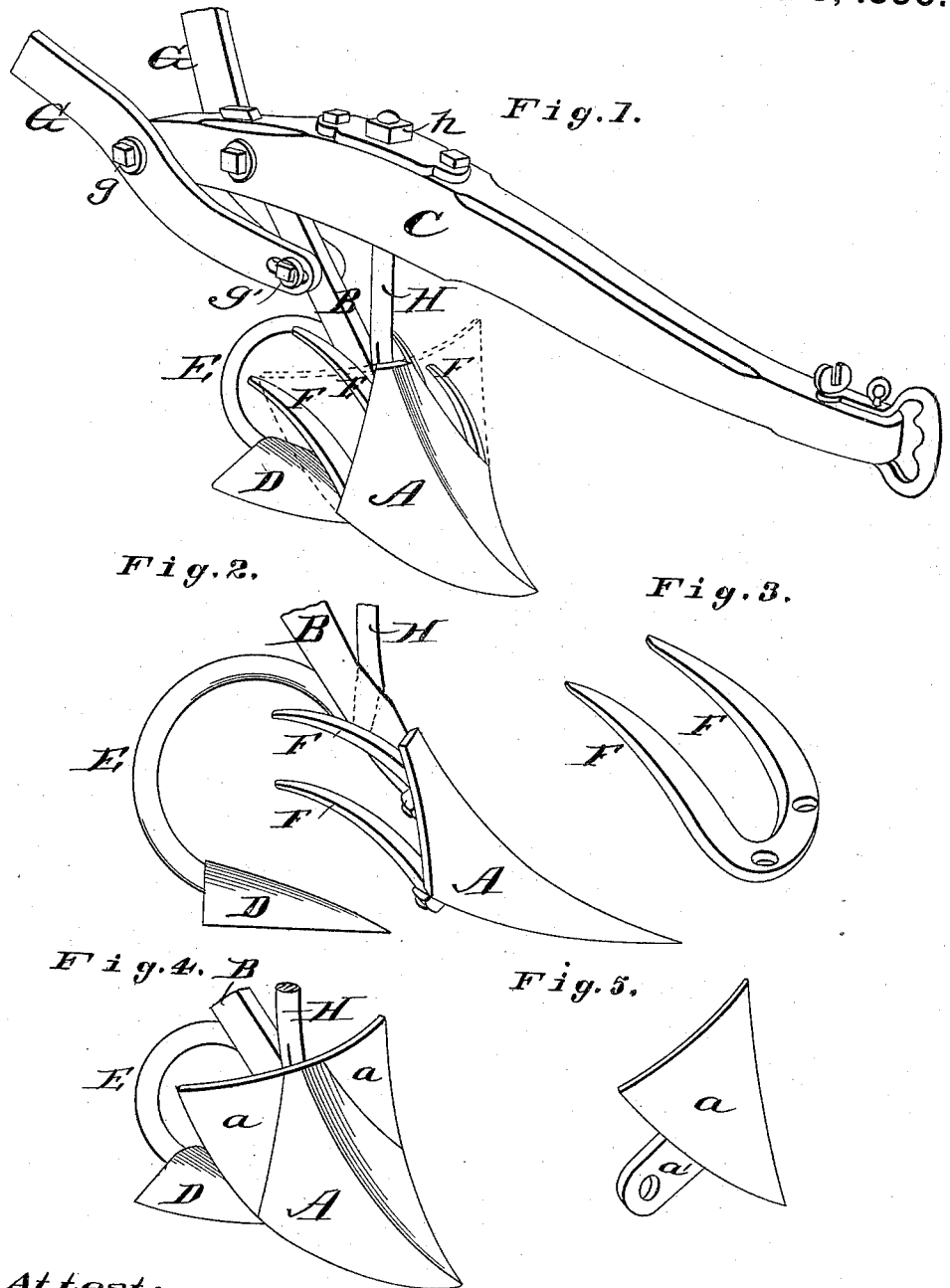
Attest:
Charles Pickles
Solon C. Kapp
Inventor:
Chrisostomus Boul,
by C. D. Moody.
atty.

UNITED STATES PATENT OFFICE.

CHRISOSTOMUS BOUL, OF OGLE STATION, ILLINOIS.

PLOW.

SPECIFICATION forming part of Letters Patent No. 232,877, dated October 5, 1880.

Application filed July 9, 1880. (No model.)

*To all whom it may concern:*

Be it known that I, CHRISOSTOMUS BOUL, of Ogle Station, St. Clair county, Illinois, have made a new and useful Improvement in Plows, of which the following is a full, clear, and exact description, reference being had to the annexed drawings, making part of this specification, in which—

Figure 1 is a view, in perspective, of the improved plow; Fig. 2, a side elevation, the beam not being shown; Fig. 3, a view showing a pair of the prongs used upon the plow; Fig. 4, a view showing the detachable plates in place upon the shovel, and Fig. 5 a view of one of the detachable plates.

The same letters denote the same parts.

The present invention relates mainly to the construction of and combination with a cultivator-shovel plow of a rear shovel, the latter being flatter than, and held directly in the rear of, the main shovel, and the two shovels, the plow-beam, and the plow-handles being relatively adjustable, substantially as hereinafter more particularly set forth.

Referring to the drawings, A represents a cultivator-shovel attached to the stock B, which is held in the beam C. D represents a shovel considerably flatter than the shovel A, and held by an arm, E, which extends from the stock B backward and downward, and so as to hold the shovel D directly in the rear of the forward shovel. The rear shovel serves to steady the plow, and also to loosen and stir up the ground in the center of the furrow after the forward shovel has passed.

The shovel A is furnished with rods or fingers F F, to enable the device to be used as a potato-digger. The rods may be made in pairs, as shown in Fig. 3, and be constructed to be bolted onto the under or rear side of the shovel.

When it is not desired to use the device as a potato-digger the rods may be covered by attaching the plates a a, Figs. 4, 5, to the shovel A. When upon the shovel the latter is as shown in Fig. 4. The plates are furnished with arms a', to enable them to be attached to the shovel.

G G represent the plow-handles. They are bolted to the beam at g and to the stock at g'. The bolt-openings at g' are elongated for the following purpose: By means of the rod H the beam can be raised or lowered. As the nut h is screwed down the beam is brought nearer the shovels, and when it is desired to depress the shovels the nut is unscrewed. Now, as the relative position of the beam and shovels is changed it is desirable to adjust the handles G G accordingly. This is done by loosening the bolts at g g', and, after properly setting the handles, tightening them again. The handles in the adjustment turn on the bolts at g, and the elongated openings at g' provide for the movement of the handles.

I claim—

The combination, in a cultivator, of the shovel A and the rear shovel, D, said shovel A having the prongs F F and the detachable plates a a, substantially as described.

CH. BOUL.

Witnesses:
CHAS. D. MOODY,
H. V. P. DRAPER.